United States Patent

[11] 3,622,884

[72] Inventor Raymond C. Kent
San Diego, Calif.
[21] Appl. No. 54,909
[22] Filed July 15, 1970
[45] Patented Nov. 23, 1971
[73] Assignee Teledyne Ryan Aeronautical Company
San Diego, Calif.

[54] MICROWAVE INTEGRATED TRANSCEIVER AND ANTENNA MODULE
10 Claims, 10 Drawing Figs.

[52] U.S. Cl. .................................................. 325/15,
325/24, 325/119, 325/158, 317/101
[51] Int. Cl. .................................................. H04b 1/58
[50] Field of Search ............................................ 325/14, 15, 21, 23, 24, 156, 158, 119, 125, 130, 445; 317/101 R, 101 B, 101 CM, 101 CP, 101 CW; 343/701, 853, 200

[56] References Cited

UNITED STATES PATENTS

| | | | |
|---|---|---|---|
| 2,890,328 | 6/1959 | Fox | 325/24 |
| 3,372,310 | 3/1968 | Kantor | 317/101 |
| 3,390,333 | 6/1968 | Klawsnik et al. | 325/14 |
| 3,474,379 | 10/1969 | Lidoski et al. | 317/101 |

*Primary Examiner*—Benedict V. Safourek
*Attorneys*—Carl R. Brown, Stephen L. King and Kenneth W. Mateer

ABSTRACT: A microwave antenna module comprising a waveguide element with the basic transmitter and receiver circuitry mounted directly on the outside of the module in the form of printed circuit boards, and directly coupled to the respective output and input probes inside the waveguide. Phase control means incorporated in the circuitry allows transmission and reception of circularly polarized radiation in the same module. The structure is very simple and the circuit boards are substantially flat on the sides of the module, thus allowing compact stacking of any number of modules in an array.

INVENTOR.
RAYMOND C. KENT

BY Carl R. Brown

ATTORNEY

INVENTOR.
RAYMOND C. KENT
BY Carl R. Brown
ATTORNEY

MICROWAVE INTEGRATED TRANSCEIVER AND ANTENNA MODULE

BACKGROUND OF THE INVENTION

Array type antennas composed of individual modules, and various techniques for scanning such arrays, are well known. For circularly polarized radiation, spiral type radiators are normally used and separate transmitter and receiver elements are required, since the received radiation has its direction of polarization reversed. The usual phase shifting means for adjusting the polarization pattern is limited to incremental shifts.

SUMMARY OF THE INVENTION

The antenna module described herein is a simple tubular waveguide element, with transmitter and receiver circuitry in the form of printed circuit boards secured on the outer surfaces of the waveguide. Output and input probes extend directly from the circuit boards into the waveguide, in their correct spaced relation. By using printed circuit boards, the external components are substantially flat and any number of modules can be compactly stacked into an array. The transmitter and receiver circuitry incorporates phase control means utilizing step recovery diodes, which provide an effectively analog phase shift control, making it possible to transmit and receive circularly polarized radiation with a single module. In the form shown, the waveguide element is built up as a tube of square internal cross section, which will accommodate radiation with linear or circular polarization. The structure comprises four metallic coated dielectric plates secured together in a simple manner to form the square tube, the flat sides providing ideal mountings for the circuit boards.

An object of this invention, therefore, is to provide an antenna module for microwave radiation, in which transmitter and receiver circuitry is mounted directly on the module.

Another object of this invention is to provide an antenna module in which the circuitry is externally mounted in a compact flat arrangement, permitting stacking of multiple modules in an array.

A further object of this invention is to provide an antenna module with means for controlling the phasing of the output and input elements in such a manner, that circularly polarized radiation can be transmitted and received in a single module.

Other objects and many advantages of this invention will become more apparent upon a reading of the following detailed description and an examination of the drawings, wherein like reference numerals designate like parts throughout and in which:

DESCRIPTION OF THE PREFERRED EMBODIMENT

Figure 1:
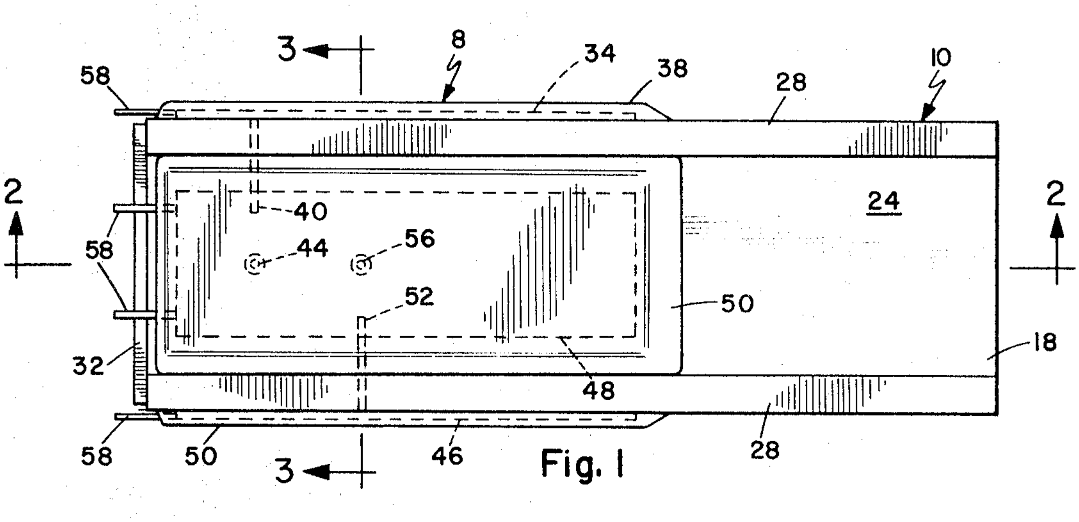
FIG. 1 is a side elevation view of a typical antenna module.
Figure 2:
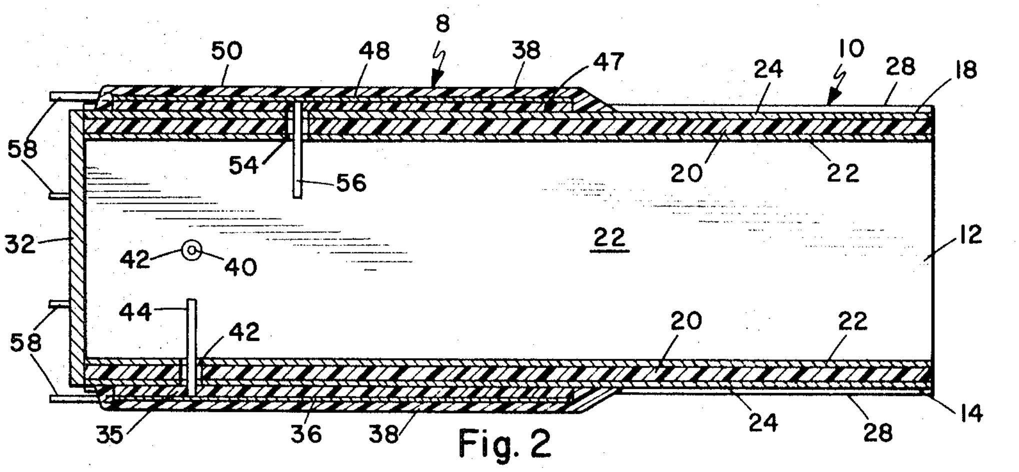
FIG. 2 is a sectional view taken on line 2–2 of FIG. 1.
Figure 3:
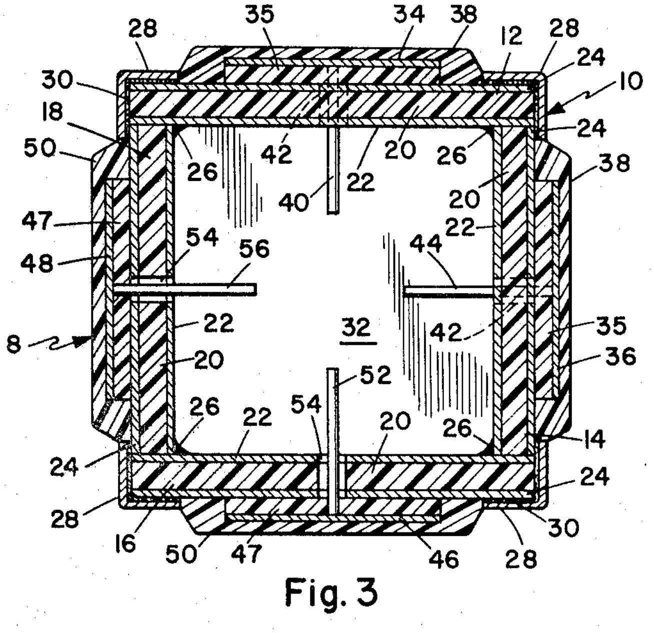
FIG. 3 is an enlarged sectional view taken on line 3–3 of FIG. 1.

The module 8 shown in detail in FIGS. 1–3, is of square cross section, but the general arrangement is also applicable to rectangular or circular configurations, the latter being limited to circular polarization.

Module 8 comprises a waveguide element 10 having four sides 12, 14, 16 and 18, each being an elongated rectangular dielectric plate 20 with metallic coatings or foils 22 and 24 covering the inner and outer surfaces, respectively. Copper clad fiberglass, or similar material, is particularly suitable. In the assembly, the inner corners of the boxlike tube are secured by solder 26 bonding the inner foils 22 together. The outside corners are secured by metallic corner strips 28 bonded to the outer foils 24 by conductive adhesive 30, or similar means. The result is a waveguide element with a continuous conductive inner surface and a continuous conductive outer surface on a dielectric supporting frame. One end of the module is closed by a shorting plate 32 bonded to the metallic foils.

Mounted on the outside of side 12 is a receiver unit 34, comprising a printed circuit board 35 on which the necessary components are assembled, a similar receiver unit 36 being mounted on side 14. The specific circuitry may vary and can include an integrated circuit chip to reduce the size as much as possible. For protection and insulation, each receiver unit is covered by a cover layer 38 of suitable potting material, or the like. An input post or probe 40 extends from receiver unit 34, through a clearance hole 42 in the side 12 and projects into the interior of the waveguide element perpendicular to the longitudinal axis thereof. A similar input probe 44 extends from receiver unit 36, through a clearance hole 42 in side 14, orthogonal to probe 40, both input probes being longitudinally spaced one quarter of a wavelength from shorting plate 32, according to the designed wavelength for which the module is to be used. As shown, the input probes extend directly from and are supported by the printed circuit boards, but could be mounted separately in any suitable manner and connected to the appropriate points in the circuitry.

Mounted on the side 16 is a transmitter unit 46 on a circuit board 47, and a similar transmitter unit 48 is secured on side 18, each being protected by an insulative cover layer 50. An output probe 52 extends from transmitter unit 46, through a clearance hole 54 in side 16, and a similar output probe 56 extends from transmitter unit 48 through side 18. The output probes are spaced one half of a wavelength from shorting plate 32, and may be supported by the printed circuit boards as shown, or mounted separately.

For convenience of connection the receiver and transmitter units each have connecting pins 58 extending from the shorted end of the module, which will be the rear of the structure in use.

Figures 6, 7:
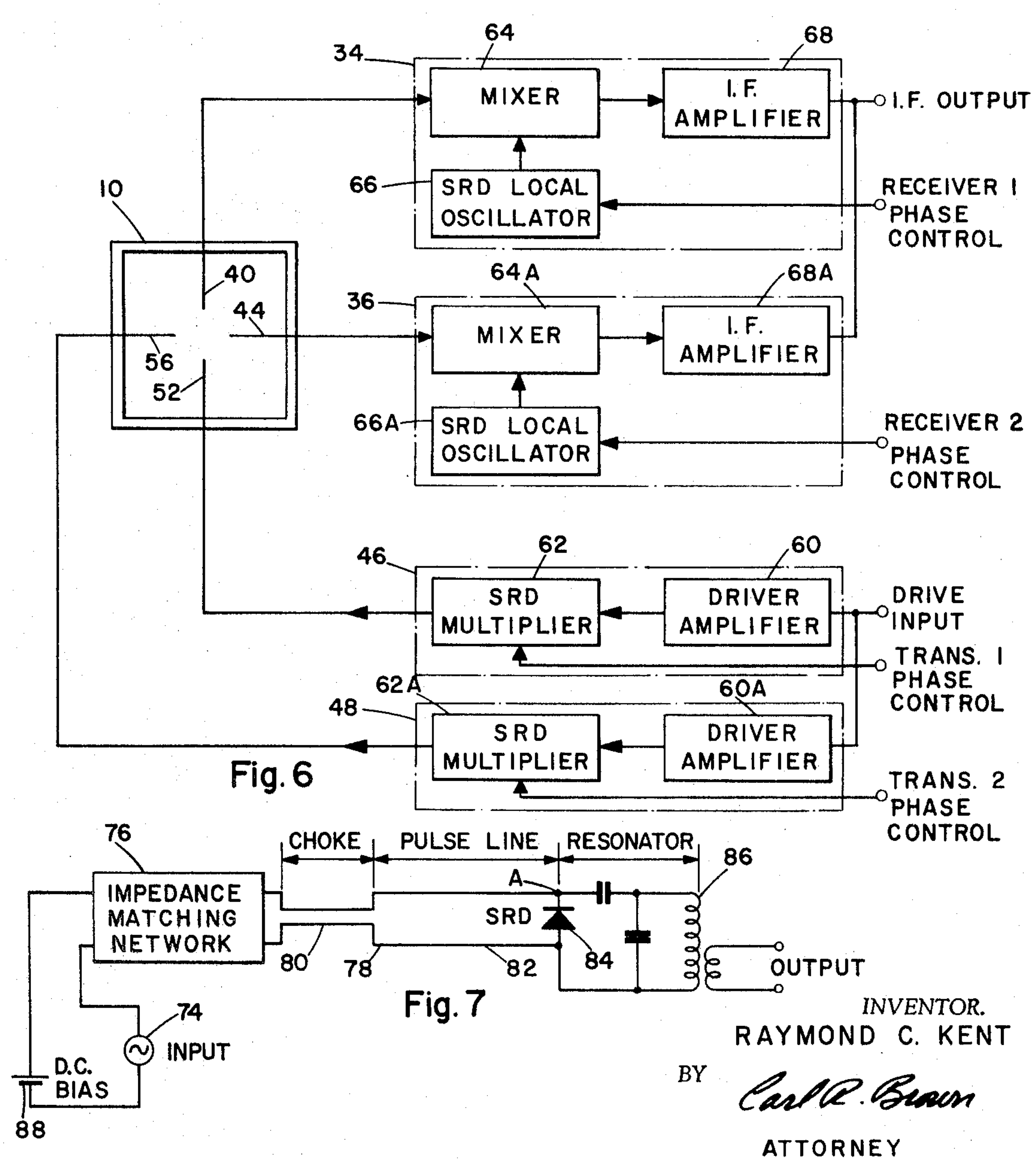
FIG. 6 is a block diagram of the transmitter and receiver components.
FIG. 7 is a wiring diagram of one form of multiplier used in the transmitter circuit.

While the transmitter and receiver circuitry may vary, the arrangement shown in FIG. 6 is particularly suitable, since it enables a single module to transmit and receive circularly polarized radiation. Transmitter unit 46 has a drive input from a transmission source, not shown, to a driver amplifier 60, which provides an amplified signal to a frequency multiplier 62, for conversion to the desired microwave frequency. The multiplier 62 incorporates a step recovery diode (SRD), the basic circuitry and principles being well known. It is the SRD which provides the effectively analog phase shift characteristics of the transmitter. The SRD is a very high speed switch which, when voltage is applied in a forward direction, stores a charge in the region of the diode junction and is then in a low impedance state. When the current is reversed, the diode continues to conduct until the stored charge is depleted, then "snaps" to a high impedance condition. The SRD is a diode whose parameters are chosen to make the transition very rapid, the time of transition being on the order of 100 pico-seconds, and the time of occurrence of the snap is varied by adding a DC bias to the driving signal.

A typical frequency multiplier is shown in FIG. 7, in which an input 74 of suitable frequency, as from amplifier 60, is applied through an impedance matching network 76 to a transmission line 78, which includes a quarter wave choke section 80 of low impedance and a pulse line 82. The SRD 84 is coupled across the output end of pulse line 82, which is connected to a high-Q resonator circuit 86 tuned to a multiple of the input frequency. A DC bias 88 is connected in the input circuit to control the snap occurrence time of the SRD. The input signal drives the SRD alternately into forward and reverse conduction, and each time the SRD snaps, it interrupts the current flow in the pulse line 82. This causes a voltage pulse at point A, the resonator thus receiving an impulse for each cycle of the input signal and acting as a flywheel circuit to provide energy to the output load between impulses. The circuit is merely an example and may vary in detail.

The output of multiplier 62, which is the transmission microwave signal, is connected to output probe 52. Transmitter unit 48 is similarly composed of a driver amplifier 60A and a multiplier 62A, whose output is connected to output probe 56.

Receiver unit 34 has a mixer 64 which receives the reflected microwave signal picked up by input probe 40, together with a reference signal from a local oscillator 66. A difference signal from the mixer is fed to an I.F. amplifier 68 to provide a suitable output to the associated receiving and analysis circuitry, not shown. Local oscillator 66 incorporates a step recovery diode, the basic circuitry being well known, which permits precise phase control of the oscillator output. Receiver unit 36 is similarly arranged, with a mixer 64A receiving an input signal from input probe 44 and a reference signal from local oscillator 66A, an I.F. amplifier 68A providing the receiver output signal.

Figures 5A, 5B, 5C, 5D:
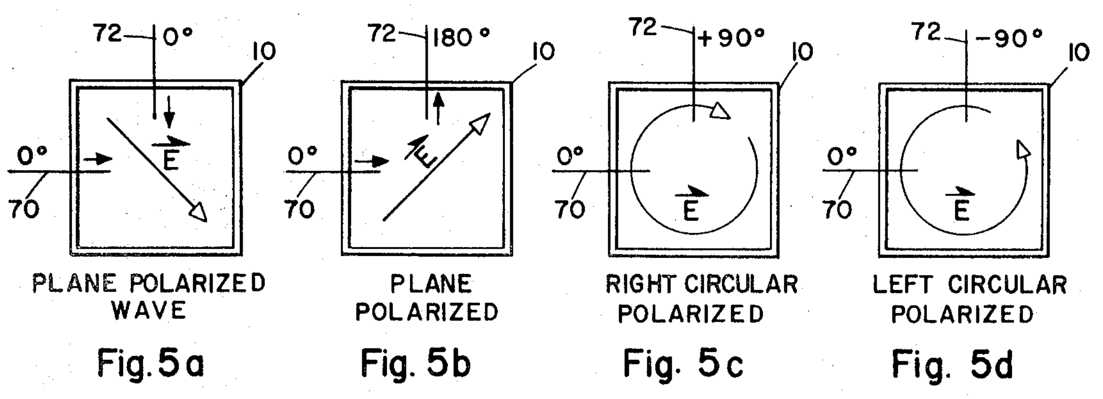
FIGS. 5*a* to 5*d* show diagrammatically the various phase relationships possible with the module.

The various polarizations obtainable are shown diagrammatically in FIGS. 5a to 5d. In FIG. 5a, both orthogonally related probes 70 and 72 are at 0° relative phase, providing one mode of plane polarization. In FIG. 5b, probe 72 is 180° out of phase with probe 70, providing another mode of plane polarization. FIG. 5c shows probe 72 at +90° of phase shift from probe 70, for right circular polarization.

Having described my invention, I now claim: FIG. 5d shows probe 72 at −90° of phase shift relative to probe 70, for left circular polarization.

With the precise phase control made possible with the circuitry used, the transmitter or output probes can be energized for one direction of circular polarization, while the input probes are set for the opposite direction of circular polarization, in order to accept the reflected and reversed signal. Thus the single antenna module is capable of handling both the transmitted and received radiation in any required mode of polarization.

To prevent overloading of the receiver by the transmitted signal, a transmitter-receiver switch, not shown, is used. This can be a conventional duplexer or the like or a diode switch incorporated in the transmitter circuitry of the module. The switch effectively shorts a quarter wavelength from the spacing of the probes 52 and 56 from shorting plate 32, so that all four probes are at an equivalent quarter wave spacing from the shorted end.

Figure 4:
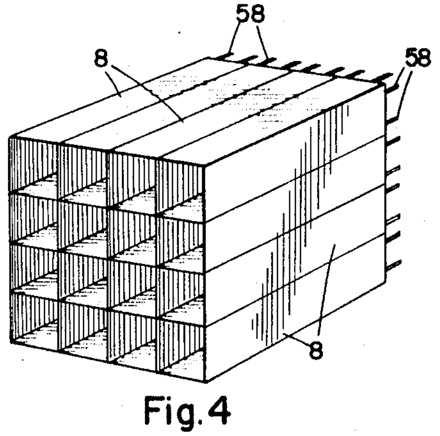
FIG. 4 is a perspective view of a typical multimodule array.

The mounting of the circuitry elements on the sides of the waveguide structure adds very little to the external cross-sectional dimension. As a result, any number of modules can be stacked in a compact array, as in FIG. 4. All of the connecting pins 58 are disposed at the rear of the array for convenient connection to suitable scanning circuitry, as used with such an array. By incorporating transmitter and receiver elements into each module and controlling phase by a simple DC bias, the associated scanning circuitry can be greatly simplified.

1. A microwave integrated antenna module, comprising, a tubular waveguide element, transmitter circuit means mounted on an external portion of said waveguide element, at least one output probe connected to said transmitter circuit means and extending into said waveguide element substantially perpendicular to the longitudinal axis thereof, receiver circuit means mounted on an external portion of said waveguide element, and at least one input probe connected to said receiver circuit means and extending into said waveguide element substantially perpendicular to the longitudinal axis thereof.

2. An antenna module according to claim 1, wherein said waveguide element has a pair of transmitter circuit units thereon, and a pair of output probes orthogonal to each other and individually connected to said transmitter circuit units, and a pair of receiver circuit units, with a pair of input probes orthogonal to each other and individually connected to said receiver circuit units.

3. An antenna module according to claim 2, and including phase control means connected to said transmitter and receiver circuit units for varying the phase relationship between the two output probes and between the two input probes.

4. An antenna module according to claim 1, wherein said waveguide element has a substantially square cross section, said transmitter circuit means including a pair of transmitter units mounted on two adjacent sides of the waveguide element, and said receiver circuit means including a pair of receiver units mounted on the other two adjacent sides.

5. An antenna module according to claim 4, wherein said transmitter and receiver units are printed circuit board elements substantially flat against the respective sides of said waveguide element, facilitating close stacking of multiple modules.

6. An antenna module according to claim 4, and including an output probe connected to each of said transmitter units in orthogonal relation, and an input probe connected to each of said receiver units in orthogonal relation.

7. An antenna module according to claim 6, wherein each of said transmitter units has a frequency multiplier section with an input for connection to a signal source, an output resonator section, a step recovery diode conductively responsive to the input signal and controlling said resonator section, and a source of DC bias connected to said input for controlling said step recovery diode.

8. An antenna module according to claim 6, wherein each of said receiver units has a mixer connected to the respective input probe, a local oscillator connected to said mixer and providing a reference signal, and means for shifting the phase of said local oscillator.

9. An antenna module according to claim 4, wherein said waveguide element comprises four flat dielectric plates having conductive coatings on opposite faces thereof and secured together in square tubular form, the inner faces being conductively interconnected and the outer faces being conductively interconnected and the outer faces being conductively interconnected.

10. An antenna module according to claim 9, and including a conductive shorting plate fixed on one end of said waveguide element and connected to said conductive coatings.

* * * * *